United States Patent

[11] 3,628,560

[72] Inventor Robert H. Ettinger
North Adams, Mass.
[21] Appl. No. 833,112
[22] Filed June 13, 1969
[45] Patented Dec. 21, 1971
[73] Assignee Sprague Electric Company
North Adams, Mass.

[54] SUPPORT AND SEAL FOR A DRIVE MEANS
6 Claims, 1 Drawing Fig.
[52] U.S. Cl. .................................................. 137/312,
277/18, 277/67
[51] Int. Cl. .............................................. F16j 15/54
[50] Field of Search .............................. 277/18, 17,
67; 137/312; 308/36.4

[56] References Cited
UNITED STATES PATENTS

| | | | |
|---|---|---|---|
| 1,760,463 | 5/1930 | Abenanti | 277/67 |
| 3,026,113 | 3/1962 | Etterman | 277/67 X |
| 3,110,157 | 11/1963 | Radd | 137/312 X |

FOREIGN PATENTS

| 46,504 | 8/1939 | Netherlands | 308/36.4 |
|---|---|---|---|

*Primary Examiner*—Henry T. Klinksiek
*Assistant Examiner*—Richard Gerard
*Attorneys*—Connolly and Hutz, Vincent H. Sweeney, James Paul O'Sullivan and David R. Thornton ABSTRACT: A drive for an operation carried on within a fluid contained in a double-walled tank in which a drive extending into the tank in which a drive extending into the tank is supported only at the end of the shaft outside of the tank and is accurately positioned in driving position by the mating of machined surfaces of the support. An annulus around the shaft and rotating with the shaft is positioned on the shaft in the dead space between the inner and outer panels of the tank double wall to prevent seepage through the inner panel from reaching the drive shaft support. A seal against seepage at the outer panel and at the shaft support is eliminated.

The combined drive shaft and support axially movable, independent of the tank, and quickly and easily mounted on and supported by the tank double wall with the mating of machined surfaces on the support and machined surfaces on the tank providing positioning and aligning of the shaft while the annulus mounted on the shaft is positioned in the double-wall dead space to protect against seepage during subsequent operation of the drive.

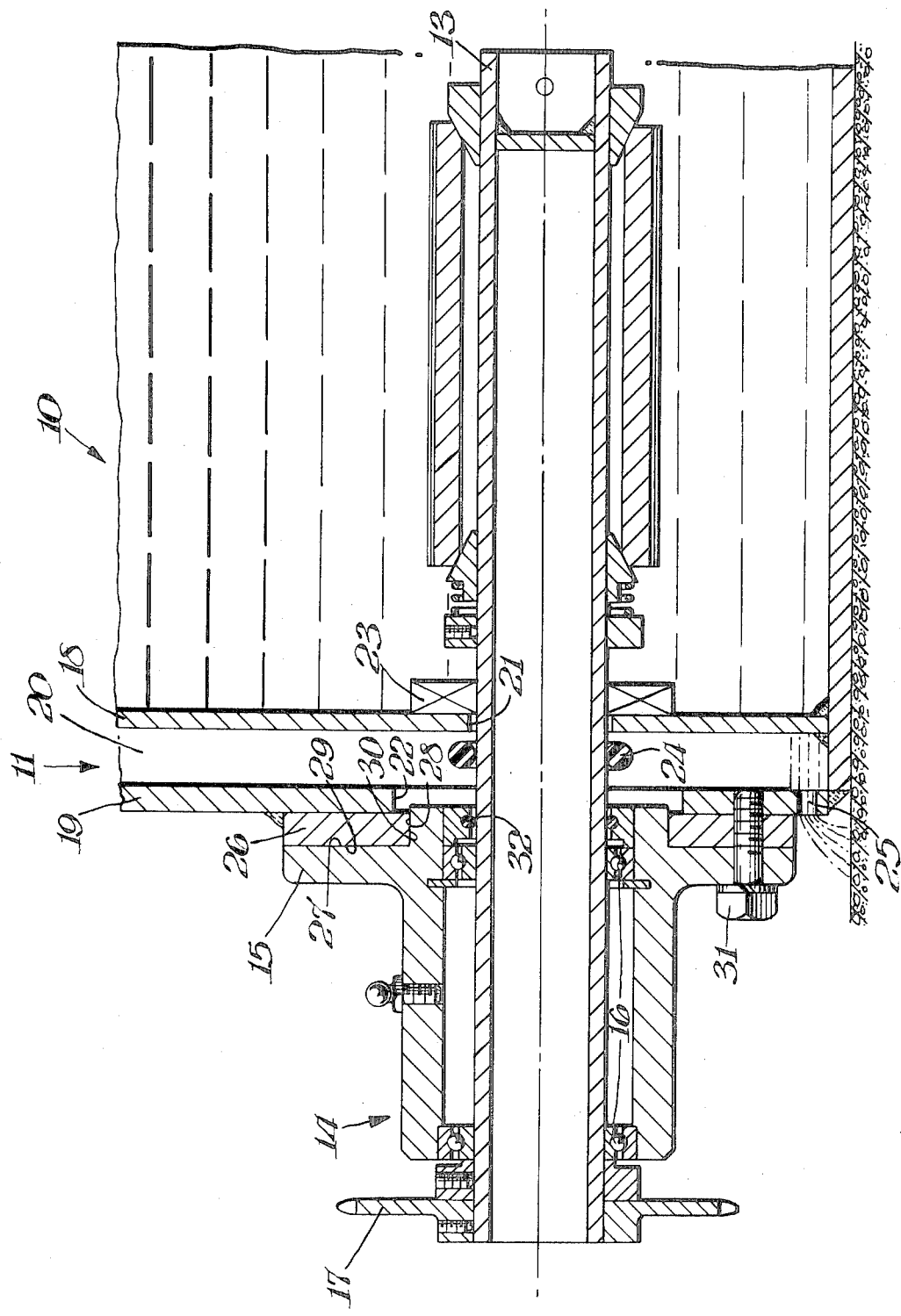

3,628,560

SUPPORT AND SEAL FOR A DRIVE MEANS

BACKGROUND OF THE INVENTION

This invention relates to the support for a drive shaft extending into a fluid-containing tank and the seal of the tank at the point of entry.

Fluid-containing tank structures having shafts which extend into the tank from outside through the tank wall are provided with seals to prevent leakage of the fluid from the tank. However, the need of the sealing parts to protect the shaft drives and supports has resulted in costly equipment in which it is difficult to easily, quickly and accurately position the shaft. Particularly, shafts which are supported only at the end outside of the tank with no support inside the tank are difficult to align and position. Also they involve complicated seals against leakage.

In certain process machinery it is vitally important to provide rotating rolls mounted on the unsupported end of a drive shaft, which unsupported end is in a precise relation to other parts of machinery in the process machinery. Where the rotating roll is in a tank of fluid, it is necessary to provide for accurate alignment of the shaft at the free end and at the same time provide for a seal against the leakage of the fluid from the tank. One such machine is a capacitor foil formation tank in which capacitor foil such as aluminum foil is carried over a number of cooperating rolls which handle and move the foil during oxide formation. The foil passes through a formation bath contained in the tank so that some of the rolls over which the foil passes are immersed in the formation electrolyte, necessitating an adequate seal of the tank at the point where the drive shaft for the roll enters the tank through the tank wall.

It is an object of this invention to provide an inexpensive support for a drive shaft outside of a tank and a seal means for restricting and disposing of the flow of any leakage of the tank at the point the shaft extends into the tank.

It is another object of this invention to provide a simple leakage-preventing device in combination with the shaft which supported outside a tank extends to within a tank and drives a roll within the tank.

It is a further object of this invention to provide a minimum of frictional contact in preventing seepage of liquid from a tank at the point of entry of a drive shaft.

SUMMARY OF THE INVENTION

A liquid-containing tank is made up of two separate walls so that there is a dead space between an outer main support panel and an inner barrier panel. A drive shaft supported outside the tank extends into the tank through a pair of aligned openings, one in each of the panels. The axially aligned openings receive the drive shaft. The drive shaft extending through the axially aligned openings and carrying a roll on its free inner end in the tank is supported only at the other end outside the tank. A support assembly for the shaft is mounted on the outer surface of the main panel. This is the only support for the shaft as the inner end of the shaft inside the tank is free and unsupported. The support assembly and the main panel each have accurately machined surfaces. There machined surfaces mate and they provide the shaft with an accurate alignment with respect to the centerline of the axial arrangement and an accurate positioning in the tank.

The inner panel is spaced from the outer panel sufficiently to permit the positioning of an O-ring on the shaft between the inner and the outer panels. The O-ring is positioned sufficiently close to the small aperture in the barrier wall and sufficiently removed from the main panel to interrupt the flow of any liquid from the bath through the inner barrier before the liquid reaches the main panel, and direct it to a region where it is drawn off, as through a drain hole.

Thus the leakage from within the tank is diverted through a drain hole and away from machined surfaces.

As a result the end of the shaft which projects into the tank is a free end and yet is held accurately in close alignment with other parts of the machine assembly within the tank.

BRIEF DESCRIPTION OF THE DRAWING

The FIGURE shows a cross section of the preferred embodiment of the invention comprising a double wall tank with a cantilever support on the tank outer wall for a drive shaft extending into the tank.

DESCRIPTION OF PREFERRED EMBODIMENT

The invention generally illustrated in the FIGURE is a means for accurately aligning and positioning a drive shaft for processing in fluid by the close mating of sets of surfaces on a supporting panel and on a support. Means for protecting these closely mating surfaces from seepage is made by the O-ring in tight engagement around the shaft in the intervening dead space between the panels making up a double wall for the processing tank.

Referring specifically to the FIGURE a processing tank 10 having a double wall 11 contains a roller body 12 removably mounted on the free end of a shaft 13 which extends through the double wall 11. The shaft 13 is supported only at the end outside of the tank 10 and by a support assembly 14 made up of a housing 15 holding sealed bearings 16 in which the shaft 13 is rotatable upon rotation applied through drive sprocket 17.

The double wall 11 consists of an inner barrier panel 18 and an outer main support panel 19 spaced apart by an intervening dead space 20. Panel 18 is provided with an aperture 21 and panel 19 with an aperture 22 which apertures 21 and 22 are axially aligned to receive the shaft 13 extending therethrough into the interior of tank 10 where the shaft 13 carries the roller body 12. A flexible seal 23 is mounted on the inner panel 18 at the aperture 21 surrounding and in connection with the shaft 13 to prevent escape of fluid from within the tank 10. An O-ring 24 is tightly clasped around the shaft 13 on that part of the shaft 13 which extends through the intervening space 20. Thus the O-ring 24 is positioned between the apertures 21 and 22 in the panels 18 and 19 respectively. The seepage of fluid from the tank through the inner panel 18 which inevitably occurs after a period of operation is removed from the shaft 13 and the vicinity of the apertures 21 and 22 by the action of the O-ring 24. This removed seeping fluid collects under the pull of gravity in the lowermost region of the intervening space 20 where a drain hole 25 serves to draw off the unwanted seeped liquid for any suitable disposal, not shown.

The support assembly 14 and the shaft 13 supported by the assembly 14 is movable axially and independent with respect to the tank 10 and its double wall 11. This axially movable combination of shaft 13 and support assembly 14 is held on and supported by the double wall 11 at a boss 26 on the outer surface of the outer main support panel 19. The boss 26 is a flat annular shape coaxial with the aperture 22 and permanently fastened to the panel 19.

As illustrated in the preferred embodiment, the housing 15 is formed with a flange and lip at the side of the housing which abuts against the boss 26. Thus the housing 15 is provided with a surface 27 in the radial dimension and a surface 28 in the axial dimension at right angles to each other. According to this invention these surfaces 27 and 28 and the boss 26 are dimensioned so that the surfaces 27 and 28 are easily moved into engagement with mating surfaces 29 and 30 respectively on the boss 26. This engagement is by an axial movement of the movable shaft and assembly combination. Thus the axial movement brings the surface 27 into close engagement with the surface 29 and the surface 28 into close engagement to the surface 30. As the surfaces 29 and 30 are accurately machined after welding of the boss 26 on the panel 19, the engagement of surfaces 27 and 28 respectively therewith causes the movable combination of shaft and assembly to be accurately positioned both axially and longitudinally. The relatively movable parts will be secured in a fixed position by suitable fastening means such as a plurality of bolts 31 fastening into the boss 26 and the panel 19.

A seal 32 is provided at the aperture 22 within the housing 15 to retain lubricant for the sealed bearings contained within the housing 15 and so as to prevent pollution of the electrolyte in tank 10.

As it is assembled, the drive means is capable of propelling sheets or other elongated members through a process fluid contained in the tank 10. The rotation of the roller body provides the propulsion. The process fluid which may seep through from the interior of the tank 10 through the panel 18 during the drive operation is prevented from reaching the mating surfaces 27, 29, 28 and 30 by the O-ring 24 and the diverted fluid is readily drained off through the drain hole 25, or can be returned to tank 10.

As an example of the operation of this invention the mating surfaces 27, 28, 29 and 30 are machined to close tolerances. In the procedure of assembling the drive, the support assembly 14 is mounted on the shaft 13 and near one end. The O-ring 24 is rolled onto the shaft 13 and positioned slightly away from the support assembly 14. The shaft carrying the assembly 14 and the O-ring is placed in position on the tank 10 by moving the combination axially into the double wall 11. The free end of shaft 13 is inserted through the apertures 22 and 21 and the flexible seal 23 so that it extends into the interior of the tank 10 where the roller body 12 is suitably attached. The axial movement of the shaft 13—support assembly 14 combination quickly and easily brings the machined surfaces 27, 29, 28 and 30 into close engagement and accurately positions the shaft 13. By the same operation the O-ring is correctly positioned adjacent the inner panel 18. This easy and accurate positioning and alignment of the shaft 13 and the O-ring 24 is a simplification of the bringing together of the parts of a drive.

A feature of the invention is the simplicity of the configuration of the machined surfaces which provide the accurate alignment and positioning. The exposed radial surface 29 of the boss 26 and the axial, aperture defining surface 30 form a male member mating into the matching radial and axial surfaces 27 and 28 on the housing 15. These surfaces are readily machined to close tolerances, thus insuring the vital accurate alignment.

A further feature of the accurately aligned mounting of the support assembly 14 on the outer panel 19 is its freedom from the complication of an attached seal. The protection against seepage is provided instead by the O-ring 24. As a result, the alignment of the movable combination is simplified.

Another advantage is the absence of any relative motion between the O-ring 24 and the surface with which it is in contact. Further, the location of the drain hole 25 insures against any seepage rising to the level of the bearing housing.

The deflector ring may be varied in its cross section profile. While the round O-ring provides protection, other shapes may also result in the desired interception and disposal of the seepage. Also, the machined mating surfaces are not limited to the illustrated arrangement of right-angle surfaces. Other matching surfaces similarly result in quick alignment by an axial movement of the shaft.

Thus, while the foregoing detailed description of an embodiment of the invention has been set down for the purpose of illustration thereof, many variations in the details herein given may be made by those skilled in the art without departing from the spirit of the invention which is limited only by the scope of the appended claims.

What we claim is:

1. An apparatus for driving a rotatable member in a fluid comprising the combination of a tank having a sidewall composed of an inner panel and an outer panel separated by an intervening space formed by said separated panels, a shaft extending from the exterior into said tank adapted to rotate within the tank, a support for said shaft positioned at the exterior portion of said shaft including a support housing and means on said outer panel, said housing and said means mating with each other to support the shaft, an annulus mounted on the shaft in the shaft section positioned in the intervening space, said annulus encircling the shaft surface and moving therewith, the said means on the outer panel having surfaces mating with and closely conforming to surfaces on the support housing so constructed and arranged that said shaft is aligned and positioned with respect to said tank and liquid escaping from within the tank through the inner panel is deflected by the annulus away from the support housing and said mated surfaces of the housing and means on the outer panel and into said intervening space.

2. An apparatus as claimed in claim 1, having at least a pair of surfaces on the support housing and at least a pair of surfaces on the support means on the outer panel and said housing surfaces mating with said support means surfaces.

3. The apparatus as claimed in claim 1 wherein the mating surfaces are machined to close tolerances.

4. In the apparatus as claimed in claim 1, a member mounted on the free inner end of the shaft and rotatable therewith.

5. The apparatus as claimed in claim 1 wherein a drain hole is provided in the outer panel.

6. The apparatus as claimed in claim 1 wherein the annulus is an O-ring.

* * * * *